(12) United States Patent
Espeset et al.

(10) Patent No.: US 9,659,596 B2
(45) Date of Patent: *May 23, 2017

(54) SYSTEMS AND METHODS FOR MOTION-VECTOR-AIDED VIDEO INTERPOLATION USING REAL-TIME SMOOTH VIDEO PLAYBACK SPEED VARIATION

(71) Applicant: Paofit Holdings Pte. Ltd., Singapore (SG)

(72) Inventors: Tonny Espeset, Oslo (NO); Andrei Richard Frank, Toronto (CA); Marc Scott Hardy, Singapore (SG)

(73) Assignee: Paofit Holdings Pte. Ltd., Singapore (SG)

(*) Notice: Subject to any disclaimer, the term of this patent is extended or adjusted under 35 U.S.C. 154(b) by 0 days.

This patent is subject to a terminal disclaimer.

(21) Appl. No.: 14/843,782

(22) Filed: Sep. 2, 2015

(65) Prior Publication Data

US 2016/0099022 A1    Apr. 7, 2016

Related U.S. Application Data

(63) Continuation of application No. 14/503,029, filed on Sep. 30, 2014, now Pat. No. 9,131,202.

(Continued)

(51) Int. Cl.
*H04N 5/93* (2006.01)
*G11B 27/034* (2006.01)
(Continued)

(52) U.S. Cl.
CPC .......... *G11B 27/034* (2013.01); *G11B 27/105* (2013.01); *H04N 5/783* (2013.01);
(Continued)

(58) Field of Classification Search
CPC .... H04N 5/783; H04N 9/8042; H04N 9/8045; H04N 19/0069; H04N 19/00151; H04N 19/132; H04N 19/137; G11B 27/105
See application file for complete search history.

(56) References Cited

U.S. PATENT DOCUMENTS 5,943,096 A    8/1999   Choo
6,130,911 A   10/2000   Lei
(Continued)

FOREIGN PATENT DOCUMENTS

EP    1006732 A2    6/2000
EP    1235426 A2    8/2002
(Continued)

OTHER PUBLICATIONS

International Search Report and Written Opinion for International Application No. PCT/SG2014/000458, Search completed Jan. 16, 2015, Mailed Jan. 22, 2015, 13 Pgs.
(Continued)

*Primary Examiner* — Huy T Nguyen
(74) *Attorney, Agent, or Firm* — KPPB LLP

(57) ABSTRACT

Systems and methods for encoding and playing back video at adjustable playback speeds by interpolating frames to achieve smooth playback in accordance with embodiments of the invention are described. One embodiment includes a source encoder that includes a processor, memory including an encoder application, where the encoder application directs the processor to: select a subset of frames from a first video sequence; generate motion vectors describing frames from the first video sequence that are not part of the selected subset of frames, where each motion vector describes movement between a frame in the subset of frames and a frame not included in the subset of frames; store the motion vectors; decimate frames not included in the subset of frames from the first video sequence to generate a second (Continued)

video sequence having a nominal frame rate less than the frame rate of the first video sequence; and encode the second video sequence at the nominal frame rate.

19 Claims, 6 Drawing Sheets

Related U.S. Application Data

(60) Provisional application No. 62/005,608, filed on May 30, 2014.

(51) Int. Cl.

| | | |
|---|---|---|
| *H04N 9/804* | (2006.01) | |
| *H04N 5/783* | (2006.01) | |
| *G11B 27/10* | (2006.01) | |
| *H04N 19/46* | (2014.01) | |
| *H04N 19/463* | (2014.01) | |
| *H04N 19/44* | (2014.01) | |
| *H04N 19/587* | (2014.01) | |
| *H04N 19/40* | (2014.01) | |
| *H04N 19/139* | (2014.01) | |
| *H04N 19/527* | (2014.01) | |
| *H04N 19/517* | (2014.01) | |

(52) U.S. Cl.
CPC .......... *H04N 9/8045* (2013.01); *H04N 19/139* (2014.11); *H04N 19/40* (2014.11); *H04N 19/44* (2014.11); *H04N 19/46* (2014.11); *H04N 19/463* (2014.11); *H04N 19/517* (2014.11); *H04N 19/527* (2014.11); *H04N 19/587* (2014.11)

(56) References Cited

U.S. PATENT DOCUMENTS

| | | |
|---|---|---|
| 6,272,179 B1 | 8/2001 | Kadono |
| 6,442,203 B1 | 8/2002 | Demos |
| 6,473,458 B1 | 10/2002 | Shimizu et al. |
| 6,560,372 B1 | 5/2003 | Kadono |
| 6,621,864 B1 | 9/2003 | Choo |
| 6,811,617 B2 | 11/2004 | Elick et al. |
| 6,985,126 B2 | 1/2006 | Hoppenbrouwers et al. |
| 7,555,043 B2 | 6/2009 | Sato et al. |
| 7,978,770 B2 | 7/2011 | Luo et al. |
| 8,064,523 B2 | 11/2011 | Togo |
| 8,265,151 B1 | 9/2012 | Wang et al. |
| 8,514,939 B2 | 8/2013 | Chen et al. |
| 9,131,202 B1 * | 9/2015 | Espeset ............... H04N 9/8045 |
| 2002/0172288 A1 | 11/2002 | Kwon |
| 2003/0091112 A1 | 5/2003 | Chen |
| 2005/0013498 A1 | 1/2005 | Srinivasan et al. |
| 2005/0140626 A1 | 6/2005 | Doyen et al. |
| 2007/0076796 A1 | 4/2007 | Shi et al. |
| 2007/0183499 A1 | 8/2007 | Kimata et al. |
| 2007/0248331 A1 | 10/2007 | Hamada et al. |
| 2008/0095519 A1 | 4/2008 | You et al. |
| 2008/0253669 A1 | 10/2008 | Hamada et al. |
| 2009/0148058 A1 | 6/2009 | Dane et al. |
| 2010/0214422 A1 | 8/2010 | Iwamura et al. |
| 2012/0288005 A1 | 11/2012 | Shishido et al. |
| 2013/0294514 A1 | 11/2013 | Rossato et al. |

FOREIGN PATENT DOCUMENTS

| | | |
|---|---|---|
| EP | 1835746 A2 | 9/2007 |
| EP | 2317763 A1 | 5/2011 |
| WO | 9916012 A1 | 4/1999 |
| WO | 2007003340 A2 | 1/2007 |
| WO | 2015183194 A1 | 12/2015 |

OTHER PUBLICATIONS

"Motion Blur Shaders", printed May 29, 2014, http://docs.autodesk.com/MENTALRAY/2014/ENU/mental-ray-help/files/shaders/production/prod_motionblur.html, 16 pgs.

Adsumilli et al., "A robust Error Concealment Technique Using Data Hiding for Image and Video Transmission over Lossy Channels", IEEE Transactions on Circuits and Systems for Video Technology, 2005, vol. 15, No. 11, 13 pgs.

Chen, Yen-Kuang et al., "Frame-Rate Up-Conversion Using Transmitted True Motion Vectors", Multimedia Signal Processing, 1998 IEEE Second Workshop on Redondo Beach, CA, USA Dec. 7-9, 1998, Piscataway, NJ, USA, IEEE, US, 7 Dec. 1 (Dec. 7, 1998), pp. 622-627, XP010318331, DOI: 10.1109/MMSP.1998.739050 ISBN: 978-0-7803-4919-3, Dec. 1998, 622-627.

Gilvarry, "Extraction of Motion Vectors from an MPEG Stream", Technical Report 1999, Dublin City University, 1999, pp. 1-35.

Huang et al., "Motion Vector Processing Using the Color Information", IEEE, ICIP 2009, pp. 01605-01608.

Schoeffmann, Klaus et al., "Visualization of Video Motion in Context of Video Browsing", Multimedia and Expo, 2009. ICME 2009. IEEE International Conference on, IEEE, Piscataway, NJ, USA, Jun. 28, 2009 (Jun. 28, 2009), pp. 658-661, XP031510838, ISBN: 978-1-4244-4290-4 the whole document, Jun. 28, 2009, 658-661.

Vatolin et al., "VirtualDub MSA Motion Estimation Filter", printed May 29, 2014, http://www.compression.ru/video/motion_estimation/index_en.html, 7 pgs.

\* cited by examiner

SYSTEMS AND METHODS FOR MOTION-VECTOR-AIDED VIDEO INTERPOLATION USING REAL-TIME SMOOTH VIDEO PLAYBACK SPEED VARIATION

CROSS-REFERENCE TO RELATED APPLICATIONS

The current application is a continuation of U.S. patent application Ser. No. 14/503,029 entitled "Systems and Methods for Motion-Vector-Aided Video Interpolation Using Real-Time Smooth Video Playback Speed Variation" to Espeset et al., filed Sep. 30, 2014, which application claims priority to U.S. Provisional Application No. 62/005,608 file Mar. 30, 2014, the disclosures of which are incorporated herein by reference.

FIELD OF THE INVENTION

The present invention generally relates to playback of video content and more specifically to enabling a playback device to vary the playback speed of the video in real time while maintaining a frame rate at each different playback speed by interpolating additional frames in real time.

BACKGROUND

Distributing video media from content providers to content consumers often requires transmitting large amounts of data across a network. These large videos are often a challenge to process, store, and transmit. In order to allow for the playback of video content on different devices with various processing capabilities, many content providers store different versions of the same video content encoded at different resolutions and/or maximum bitrates (e.g., High Definition, and Standard Definition) and are thus able to distribute different encodings of a piece of video content to a playback device based on prevailing network conditions. Network conditions are especially important when streaming video content in real-time since network deterioration may result in a stuttering effect of the video being played back on the playback device. The size of an original piece of video content may be reduced by re-encoding the video using different encoding parameters such as (but not limited to) picture resolution (e.g., 720p, 1080p, 4 k, etc.), frame rate (i.e., 24, 30, 48, 60 frames per second, etc.), bitrate (e.g., 12 Mbps, 40 Mbps, etc.), frame size, color depth, among various other characteristics of the video.

Most standard video playback has historically been delivered at a range of between 24 and 30 frames per second. However, many of today's video games, as well as an increasing portion of TV sets are able to render video at higher rates, and often up to 60 frames per second and beyond. This increased frame rate can provide the user with a smoother, more fluid viewing experience and is generally considered to resemble real world movement. However, distributing video at such frame rates often requires a significant amount of bandwidth capacity being made available on the network.

Furthermore, media distributed by content providers to content consumers is often encoded using a variety of video compression standards that facilitate the distribution of the content across a network. Well known compression standards include H.264/MPEG-4 AVC, published by the ITU-T Video Coding Experts Group (VCEG) together with the ISO/IEC JTC1 Moving Picture Experts Group (MPEG), and the newer High Efficiency Video Coding (HEVC) standard, MPEG-H Part 2, developed by MPEG and VCEG, both of which are herein incorporated by reference. Video compression or video encoding typically involves compressing the amount of information used to describe the frames of video in a video sequence in order to reduce the consumption of network resources when distributing content. Media playback devices may include a video decoder used to decode an encoded video prior to playback on the device. However, video decoded from an encoded video elementary bit stream is often limited to playback at the particular encoding profile at which the video was initially encoded. In particular, the frame rate used to play back a video is typically determined based on the particular encoding profile used to encode the video and varying the playback speed of a video may effect the viewing quality of the video.

SUMMARY OF THE INVENTION

Many different applications can benefit from the ability to smoothly vary the playback speed of a video sequence by interpolating additional frames between frames in the sequence in real time, including video games, surveillance, video editing, among various others. However, currently reducing the speed of video in real-time, if the speed is reduced sufficiently and the frame rate of the original video file is not high enough, produces a stuttering effect whereby the motion does not look smooth and natural to a viewer. Generally, this becomes observable to the human eye when the playback frame rates are reduced below 18-20 images per second. Likewise, if speed is increased, there may be cases when a frame required for smooth motion is missing in the frames of the video sequence, and a closest frame may be repeated for display. This may also produce a small visual stutter. Several embodiments of the invention allow for playback at adjustable playback speeds by interpolating the necessary number of frames to playback the encoded video at a desired frame rate that provides a smooth viewing quality. In particular, since the motion data are stored as vectors, new frames may be interpolated for any particular time interval between a series of frames and thus the playback device is able to playback the video at any desired playback speed while retaining a smooth video viewing experience.

There can also be a significant benefit to distributing video content encoded at a reduced size yet providing the same level of image quality as the original video encoding. However, re-encoding video to reduce the size of the encoded video content, when the original video content has already been efficiently encoded, generally results in a reduction of the quality of the video played back by a playback device. Many embodiments of the invention are able to encode video by decreasing the number of frames and inserting motion vectors that can be used to interpolate the deleted frames during playback.

Systems and methods in accordance with embodiments of the invention encode and play back video at adjustable playback speeds by interpolating frames to achieve smooth playback. One embodiment includes a source encoder that includes a processor, memory including an encoder application, where the encoder application directs the processor to: select a subset of frames from a first video sequence; generate motion vectors describing frames from the first video sequence that are not part of the selected subset of frames, where each motion vector describes movement between a frame in the subset of frames and a frame not included in the subset of frames; store the motion vectors;

decimate frames not included in the subset of frames from the first video sequence to generate a second video sequence having a nominal frame rate less than the frame rate of the first video sequence; and encode the second video sequence at the nominal frame rate.

In a further embodiment, the encoder application directs the processor to store the motion vectors encoded as pixels within frames in the subset of frames.

In another embodiment, a motion vector includes an angle component and a magnitude component, where the angle component is stored within a hue value of a pixel and the magnitude component is stored within a brightness value of a pixel.

In a still further embodiment, the subset of pixels are located within a portion of the frame that is not displayed during playback of the decoded frame.

In yet another embodiment, the encoder application configures the processor to encode the new video sequence as a sequence of intra and inter frames.

In yet another embodiment, each motion vector describes the movement of at least one pixel between a frame and at least one subsequent frame in the first video sequence.

In a further embodiment, the motion vectors are stored in a separate file, and each motion vector corresponds to a particular frame in the subset of frames.

In a still further embodiment, the encoder application configures the processor to: compute a motion vector for each pixel in a frame in the subset of frames; and compress motion vectors of a subset of neighboring pixels in the frame to generate a new motion vector.

In a still further embodiment, the encoder application configures the processor to: compute a motion vector for each pixel in a frame in the subset of frames; and discard a plurality of motion vectors to generate a set of motion vectors describing a frame that is not in the subset of frames.

A further additional embodiment includes a playback device that includes a processor configured to communicate with a memory, where the memory contains a media player application and a decoder application, where the decoder application directs the processor to: configure a video decoder based upon encoding parameters including a nominal frame rate; decode encoded frames of video using the video decoder to provide decoded frames of video at the nominal frame rate; where the media player application directs the processor to: configure a video decoder to decode encoded frames of video by providing the decoder application with encoding parameters including a nominal frame rate; extract a set of motion vectors describing a frame of video that can be interpolated based upon at least one decoded frame of video received from the video decoder; and interpolate at least one interpolated frame using the set of motion vectors and the at least one frame of decoded video; and playback a sequence of frames of video including at least one decoded frame of video and at least one interpolated frame of video.

In a further embodiment, the media player application directs the processor to extract a set of motion vectors describing at least one interpolated frame of video from a subset of pixels in at least one decoded frame of video.

In another embodiment, the media player application directs the processor to analyze a hue value of a pixel in a decoded frame of video to determine an angle of a motion vector and analyze a brightness value of a pixel to determine a magnitude of a motion vector.

In a still further embodiment, the media player application directs the processor to: determine a playback speed for the decoded video; and interpolate a number of new frames based on the playback speed and the nominal frame rate of the encoded video.

In a yet further embodiment, the media player application directs the processor to compute motion vectors describing each pixel in an interpolated frame using the set of motion vectors and bilinear filtering.

In yet another embodiment, the media player application directs the processor to playback a sequence of frames comprising at least one decoded frame followed by at least one interpolated frame.

In a further embodiment, the media player application directs the processor to extract a set of motion vectors describing at least one interpolated frame from red, green, blue pixel values of at least one pixel in at least one decoded frame.

In another embodiment, the media player application directs the processor to extract the set of motion vectors describing a frame of video that can be interpolated based upon at least one decoded frame of video received from the video decoder from pixels located in a subset of rows of the at least one decoded frame.

In still another embodiment, media player application directs the processor to playback the portion of the at least one decoded frame that does not contain rows of pixels from which motion vectors are extracted.

In a further embodiment, the set of motion vectors are extracted from a separate file.

In still a further embodiment, the media player application configures the processor to: determine a change in the playback speed of the decoded video; and interpolate a number of frames between decoded frames of video to maintain a frame rate of the decoded video at the changed playback speed.

DETAILED DESCRIPTION

Figure 1:
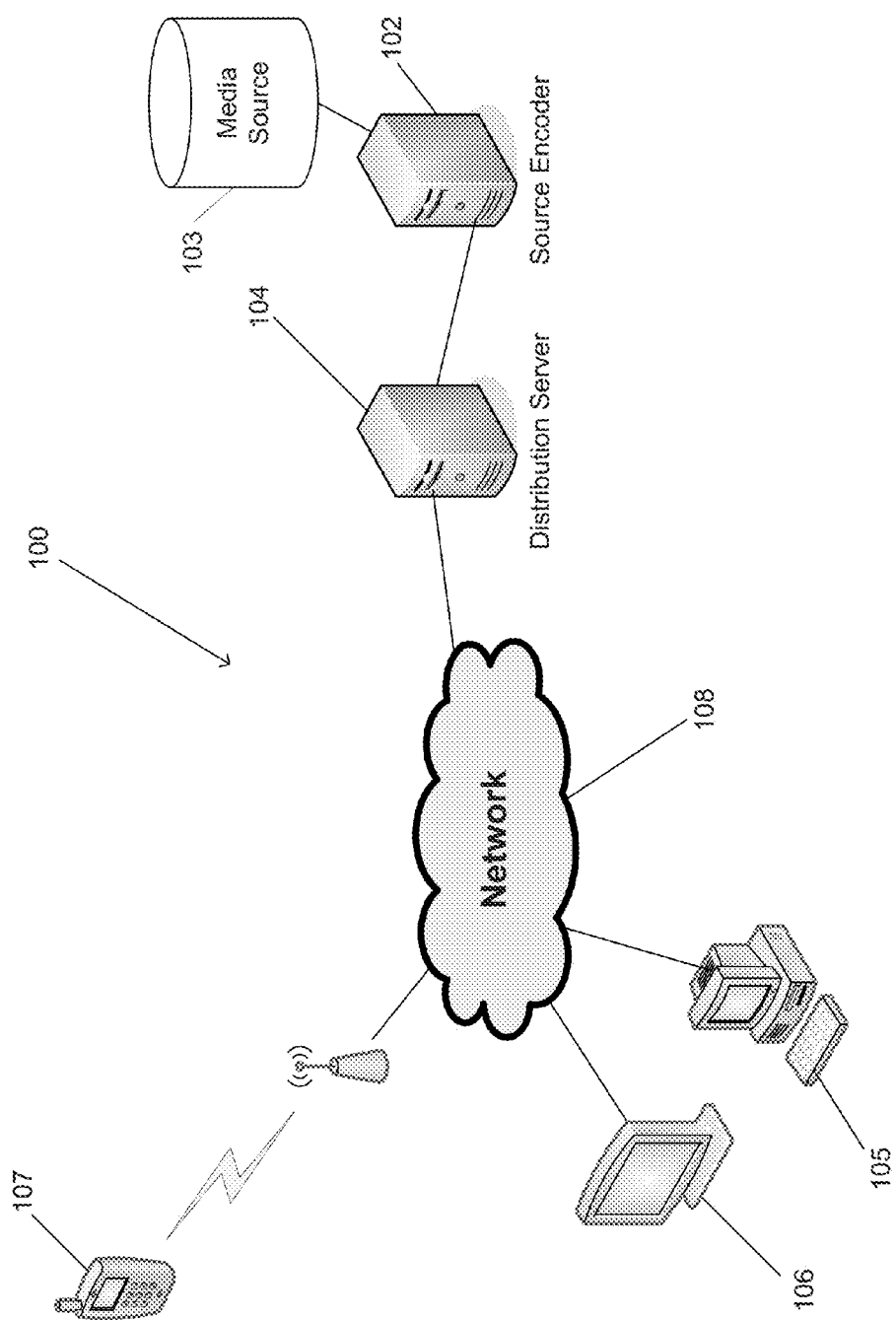
FIG. 1 is a network diagram of a system for distributing video encoded with motion vectors in accordance with an embodiment of the invention.

Turning now to the drawings, systems and methods for encoding and playing back video at adjustable playback speeds by interpolating frames to achieve smooth playback in accordance with embodiments of the invention are illustrated. In a number of embodiments, re-encoding video at a reduced frame rate may reduce the size of an encoded video sequence. To reduce the number of frames in a video encoding and yet maintain the quality of the video, many embodiments compute and store motion vectors describing the frames of the originally encoded video content that are deleted during the re-encoding of the video at the lower frame rate. These motion vectors are stored in such a way that they can be accessed following the decoding of the re-encoded video sequence. In this way, the motion vectors may be used to interpolate the deleted frames during playback to enable playback of the video sequence at the original frame rate, despite the video sequence being encoded at the lower frame rate. Furthermore, a playback device may use the motion vectors to maintain the visual quality of the video content when varying playback speed in real-time. Many embodiments maintain visual quality of video content at different playback speeds by interpolating additional frames of video as needed to maintain a particular frame rate at the particular playback speed. In particular, since the motion data of pixels between a series of frames may be stored as vectors with a direction and length (i.e., magnitude) component, new frames may be interpolated between a series of frames for any particular time interval (i.e., playback speed) by computing an estimate of the amount a pixel is likely to move in the direction of the motion vector during a specific time interval. The motion vectors provide the positions of moving objects at times between a first and second frame and thus one or more interpolated frames inserted between the first and second frames can show the objects at the interpolated positions indicated by the motion vectors.

In order to generate the motion vectors, many embodiments analyze data regarding how pixels move between frames and save the movement data as motion vectors. In several embodiments, the motion vectors may be embedded in the video frames that are encoded to create a reduced frame rate video sequence. In other embodiments, the motion vectors may be stored in a separate location within the video elementary bitstream, a separate location within a container file, and/or within a separate file that accompanies the encoded video. In several embodiments, the motion vectors are encoded to require less storage space than the video frames deleted from the original sequence of (encoded) video frames thus reducing the size of the original encoded video. Accordingly, the reduced size of the encoded video may reduce the storage space utilized when storing the encoded video. Furthermore, the reduced size of the encoded video may facilitate the distribution and subsequent processing of the encoded video across networks. In particular, the reduced size of the encoded video may reduce the amount of network bandwidth utilized when distributing the encoded video.

In several embodiments, the motion vectors provide a direction and distance that one or a collection of pixels relative to their locations in one or more video frames. In many embodiments, the motion vectors may describe the forward movement of pixels through subsequent frames of a video sequence relative to a particular reference frame. In some embodiments, the motion vectors may also describe the backwards movement of pixels through preceding frames of a video relative to the particular reference frame. In certain embodiments, a motion vector is stored using Cartesian coordinates (i.e., (x,y) movement) that provide a numeric offset of a number of pixels by which a particular pixel moves between frames. Numerous embodiments may define the motion vectors using polar coordinates (i.e., distance, angle). In several embodiments, the motion vectors may be encoded as additional pixels within a frame. Several embodiments may use hue-saturation-lightness (HSL) or hue-saturation-brightness (HSB) representations in a red, green, blue (RGB) color model to encode motion vectors. In particular, in some embodiments that use polar coordinates, an angle component of a motion vector may be stored as a hue value of a pixel and the length component of the motion vector may be stored as the brightness value of the pixel. Using hue and brightness values of a pixel to store the motion vectors may provide for an increased level of precision regarding the movement of the pixels relative to the motion vectors used in encoding inter frames (i.e. frames encoded by reference to one or more frames in the video sequence). Furthermore, the hue and brightness values of a pixel are generally subject to less loss of information during subsequent encodings that may be applied to a video sequence in comparison to other color values of a pixel such as the red, green or blue component values.

In order to allow for real time decoding of the color information to extract motion vectors and perform interpolation of one or more frames of video, some embodiments use a graphics processing unit (GPU) within a playback device capable of performing many operations in parallel. The term GPU is generally used to describe a class of electronic circuits designed to rapidly manipulate and alter memory to accelerate the creation of images in a frame buffer intended for output to a display. Many GPUs exploit a highly parallel structure, which makes them more effective than general-purpose processors for algorithms where processing of large blocks of data can be performed in parallel. Several embodiments utilize lookup tables that output a hue angle based upon the red, green and blue color component values of a pixel. This can provide a dramatically increased frame rate with negligible overhead.

Systems and methods for systems and methods for encoding and playing back video at adjustable playback speeds by interpolating frames to achieve smooth playback in accordance with embodiments of the invention are discussed further below.

System Architure for Distributing Video with Adjustable Playback

A system for encoding and playing back video at adjustable playback speeds by interpolating frames to achieve smooth playback interpolating the encoded frames using motion vector data in accordance with an embodiment of the invention is illustrated in FIG. 1. The system 100 includes a source encoder 102 configured to encode original video content into encoded video. In many embodiments, the source encoder may be used to reduce the size of the encoded video content relative to the original video content, which may itself have already been efficiently encoded at a higher nominal frame rate. In particular, in several embodiments the source encoder may reduce the size of the encoded video by reducing the number of frames in the video, which thereby reduces the nominal frame rate of the video. The term "nominal frame rate" is used here to indicate the rate at which the video is decoded by a video decoder. As is discussed further below, the encoding of the video contemplates playback at a higher frame rate than the nominal frame rate by the interpolation of decoded frames and/or playback at different playback speeds at the nominal or a specified frame rate by interpolating frames. Therefore, the nominal frame rate indicates the number of encoded frames decoded during a specified time interval by a video decoder and is typically specified in a header of a video file containing the encoded video. In certain embodiments, the source encoder may reduce the size of an encoded video by modifying other characteristics of the video, including (but not limited to) picture resolution, frame size, bitrate, and/or color encoding. In order to reduce the size of an encoded video by reducing the frame rate, the source encoder in many embodiments may compute and store motion vectors describing the movement of pixels between frames of the source video sequence and delete frames from the source video sequence described by the motion vectors.

The source encoder 102 may store different versions of the same video content within the media source storage 103. A version of a piece of video content may include video encoded at a certain encoding profile that specifies a particular set of encoding parameters used to encode the video. The encoding parameters may specify, for example, the nominal frame rate, picture resolution, frame size, and/or bitrate used to encode the video. The source encoder may re-encode the video content at a reduced nominal frame rate, and including computed motion vectors in order to further facilitate for the distribution of the encoded video across a network. Well known compression standards that can be used to encode the sequence of frames contained within the re-encoded video content can include, among various other standards, the H.264/MEPG-4 AVC and the newer HEVC standard. The generation of motion vectors in accordance with various embodiments of the invention are discussed further below.

In the illustrated embodiment, the source encoder is a server including one or more processors directed by an encoding software application. In other embodiments, the source encoder can be any processing device including a processor and sufficient resources to perform the transcoding of source media including (but not limited to) video, audio, and/or subtitles. In some embodiments, the encoded video is then uploaded to a distribution server 104. In many embodiments, source encoder uploads the encoded video.

In a number of embodiments, the distribution server 104 distributes the encoded video to one or more playback devices 105-107 using one or more distribution channels. The distribution server may distribute the encoded video to different playback devices requesting video. In many embodiments, the distribution server receives and processes download requests from a variety of playback devices that seek to download the encoded video. When the distribution server receives a download request from a playback device, it can provide the playback device with access to download the encoded video. The encoded video may include motion vectors that the playback device can use to interpolate additional frames. A distribution server 104 can also push video content encoded in accordance with embodiments of the invention to playback devices.

In some embodiments, the distribution server receives requests to stream video content from a variety of playback devices and subsequently streams the encoded video to the playback devices for playback. In several embodiments, the variety of playback devices can use HTTP or another appropriate stateless protocol to request streams via a network 108 such as the Internet. In several embodiments, a variety of playback devices can use RTSP whereby the distribution server records the state of each playback device and determines the video to stream based upon instructions received from the playback devices and stored data describing the state of the playback device.

During the playback of video encoded in accordance with various embodiment of the invention, a playback device may initially decode encoded frames of video contained within an elementary bitstream by configuring a decoder based upon encoding parameters provided to the playback device describing the encoding of the elementary bitsteam. In several embodiments, the encoding parameters specify characteristics of the encoded video including (but not limited to) a resolution for the encoded frames of video and a nominal frame rate for the encoded frames of video. Video encoding techniques, such as (but not limited to) block based encoding techniques, can encode blocks of pixels within a frame of video by referencing a corresponding block of pixels in a previous and/or subsequent frame of video. The references are typically referred to as motion vectors, because they specify the movement of the block of pixels between frames. During the decoding process, a video decoder on a playback device can use motion vector data within an encoded frame of video to decode the frame of video based upon other decoded frames in the video sequence.

In several embodiments, additional encoding parameters describe characteristics of motion vectors that can be used to interpolate additional frames using the decoded frames from the elementary bitstream. A playback device in accordance with many embodiments of the invention can utilize the additional encoding parameters describing motion vectors that can be used to interpolate additional frames to obtain an additional set of motion vector data, either embedded within the decoded frames of video (i.e. recovered after the encoded video sequence is decoded) or stored separately. The additional set of motion vector data can be used to interpolate additional frames of video between frames from the decoded video sequence as needed based on a desired playback speed and/or frame rate.

In the illustrated embodiment, playback devices include personal computers 105-106 and mobile phones 107. In other embodiments, playback devices can include consumer electronics devices such as DVD players, Blu-ray players, televisions, set top boxes, video game consoles, tablets, and other devices that are capable of connecting to a server and playing back encoded video. Although a specific architecture is shown in FIG. 1, any of a variety of architectures can be utilized that enable playback devices to request video encoded with motion vectors that may be used to interpolate additional frames as necessary for playback of video at different frame rates as appropriate to the requirements of specific applications in accordance with embodiments of the invention.

Figure 2:
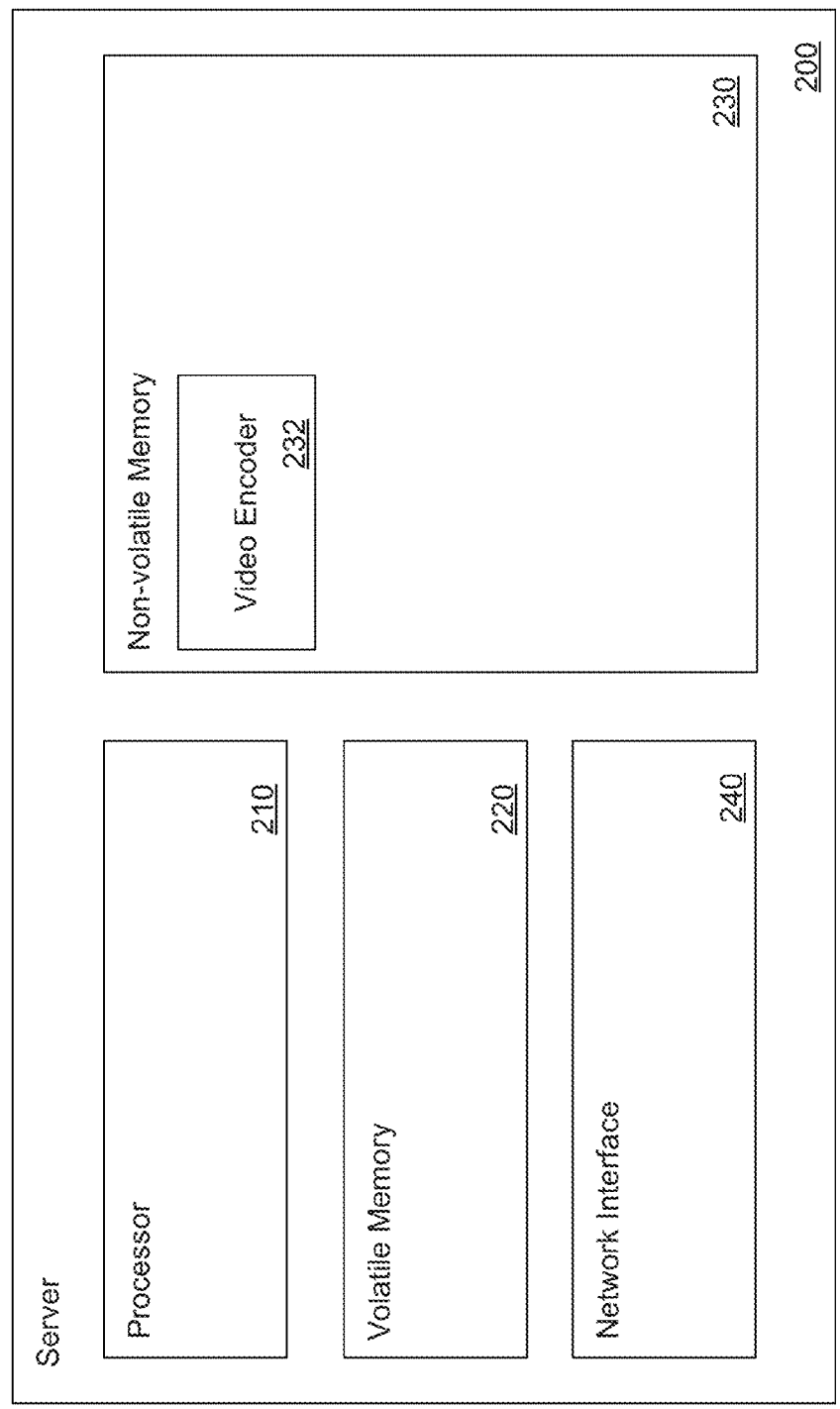
FIG. 2 conceptually illustrates a server configured to encode video with motion vectors in accordance with an embodiment of the invention.

The basic architecture of a source encoder in accordance with an embodiment of the invention is illustrated in FIG. 2. The source encoder 200 includes a processor 210 in communication with non-volatile memory 230, volatile memory 220, and a network interface 240. In the illustrated embodiment, the non-volatile memory 220 includes a video encoder 232 that configures the processor to encode video. In some embodiments, the video encoder may also reduce the size of an original piece of encoded video content by reducing the number of frames in the video sequence and generating motion vectors that may be used to interpolate the deleted frames during playback. In several embodiments, the network interface 240 may be in communication with the processor 210, the volatile memory 220, and/or the non-volatile memory 230. Although a specific source encoder architecture is illustrated in FIG. 2, any of a variety of architectures including architectures where the video encoder is located on disk or some other form of storage and is loaded into volatile memory at runtime can be utilized to implement source encoders in accordance with embodiments of the invention.

Figure 3:
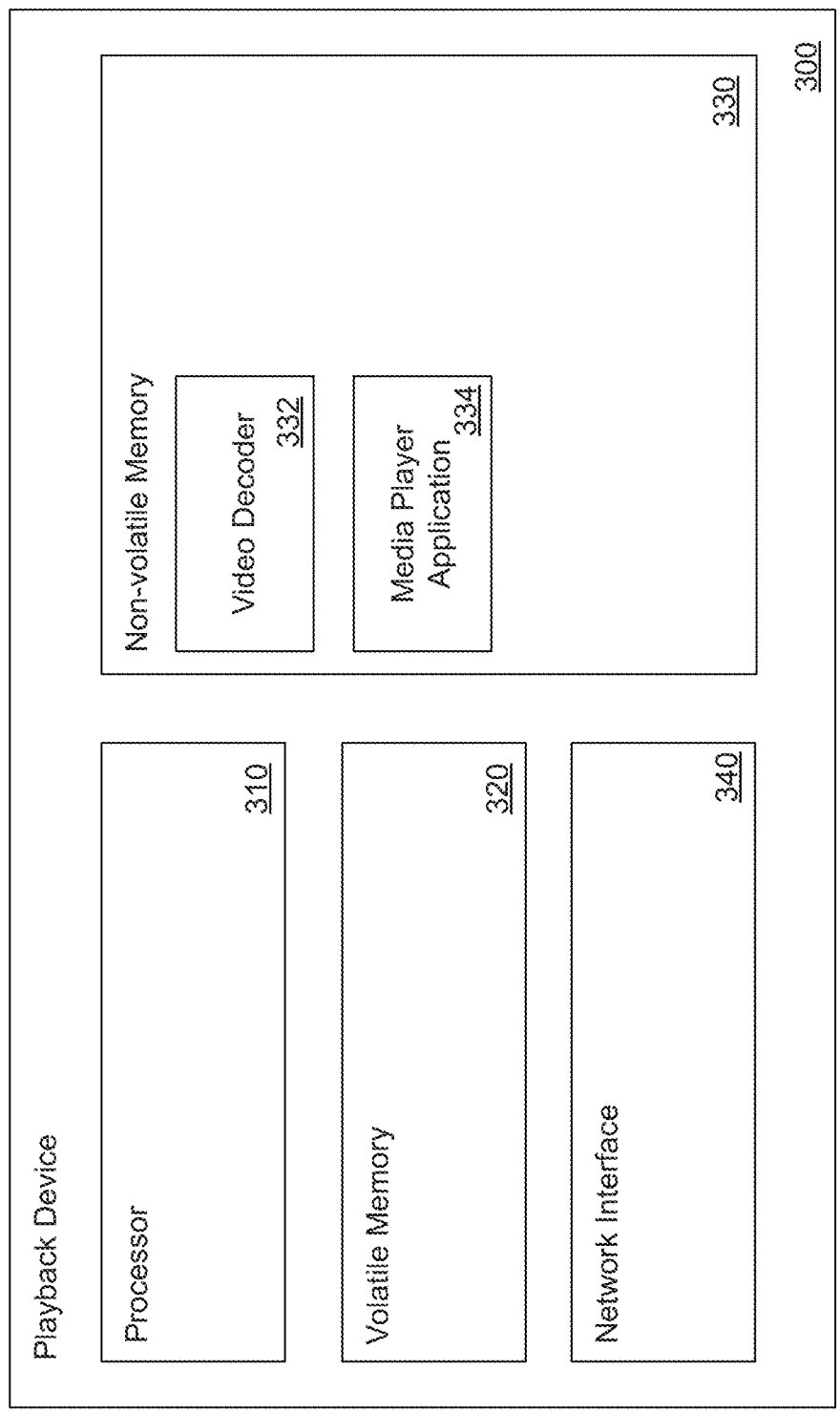
FIG. 3 conceptually illustrates a playback device configured to play back video encoded with motion vectors in accordance with an embodiment of the invention.

The basic architecture of a playback device in accordance with an embodiment of the invention is illustrated in FIG. 3. The playback device 300 includes a processor 310 in communication with non-volatile memory 330, volatile memory 320, and a network interface 340. The processor 310 can be implemented using one or more general purpose processors, one or more graphics processors, one or more FPGAs, and/or one or more ASICs. In the illustrated embodiment, the non-volatile memory 320 includes a video decoder 332 that configures the processor to decode encoded video and a media player application 334 configured to obtain encoded video and deliver an elementary bitstream of encoded video to the video decoder. In many embodiments, the media player application 334 may also extract motion vectors from the decoded video frames returned by the video decoder 332 and interpolate additional video frames using motion vector data obtained by the media player application as needed for different playback speeds of the video during playback. As noted above, the motion vector data can be embedded in the decoded frames and/or obtained from a variety of locations including (but not limited to) user data within the elementary bitstream, data within a container file containing the encoded video, and/or a separate file obtained using a manifest that identifies the encoded video and the location of the motion vector data.

In several embodiments, the network interface 340 may be in communication with the processor 310, the volatile memory 320, and/or the non-volatile memory 330. Although a specific playback device architecture is illustrated in FIG. 3, any of a variety of architectures including architectures where the applications are located on disk or some other form of storage and is loaded into volatile memory at runtime can be utilized to implement playback devices in accordance with embodiments of the invention.

Encoding Interpolation Frames Using Motion Vectors

Figure 4:
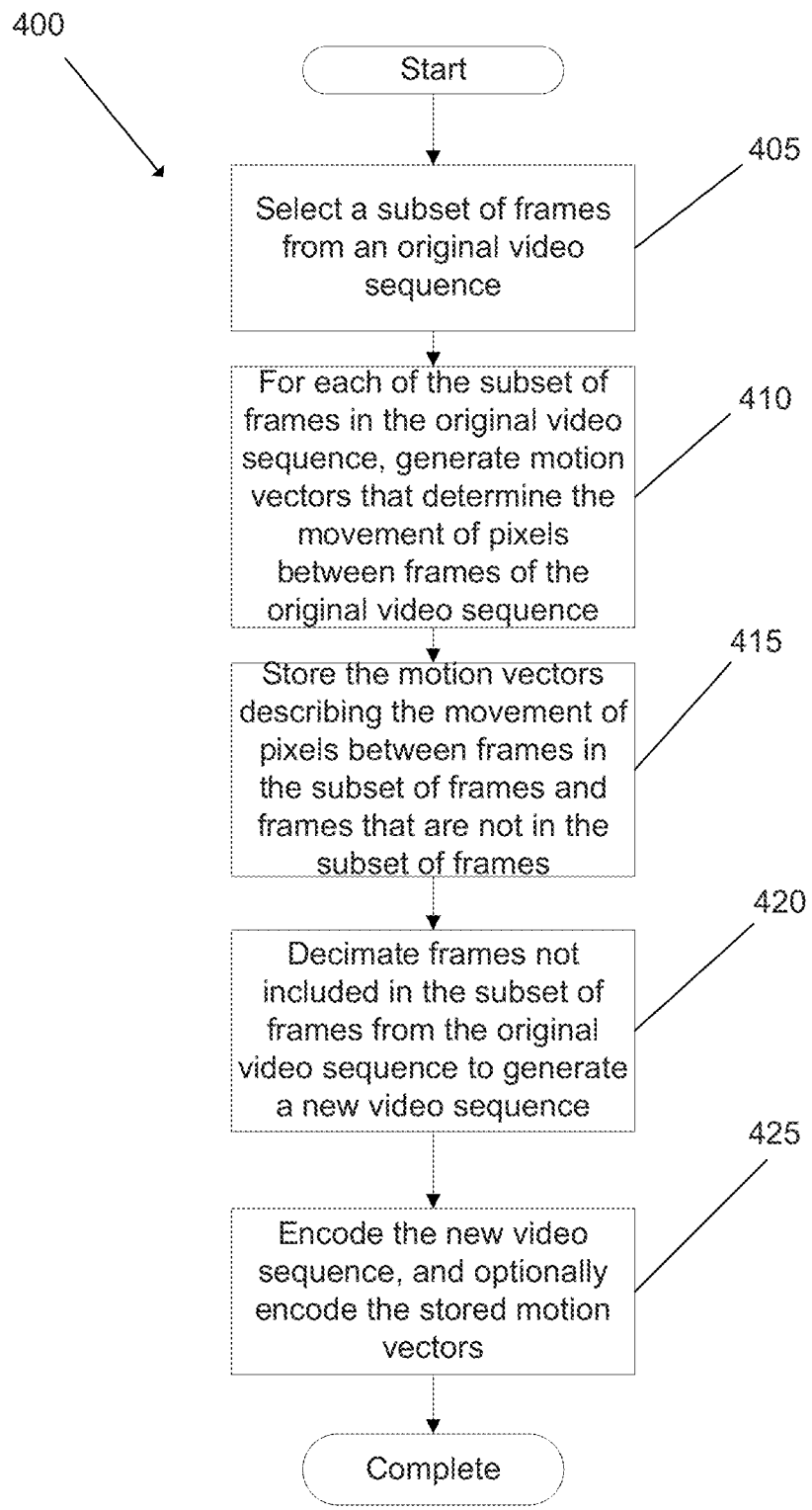
FIG. 4 is a flow chart illustrating a process for encoding and decoding video at a frame rate that is higher than the frame rate of the encoded video stream by interpolating the encoded frames using motion vectors in accordance with an embodiment of the invention.

As described above, many embodiments of the invention are able to reduce the size of an original piece of encoded video by reducing the number of frames in the video sequence and storing motion vectors that may be used to interpolate the deleted frames. Furthermore, these motion vectors may be used during playback to modify the playback speed of the video and yet maintain a smooth video viewing experience. A process for encoding video at a nominal frame rate and generating motion vectors that can be utilized to interpolate additional frames in accordance with embodiments of the invention is illustrated in FIG. 4.

The process 400 commences by selecting (405) a subset of frames from an original video sequence. In some embodiments, the process selects the subset of frames to include in a new video sequence by selecting each $N^{th}$ frame in the sequence of frames, thereby reducing the number of frames in the new video sequence. For example, if the process selects every other frame in a sequence that includes an even number of total frames Z, starting from N (i.e., N, N+2, ... Z), the process may be able to reduce the number of frames in the new video sequence to ½ the number of frames in the original video sequence (i.e., Z/2). Other embodiments may select frames using other mechanisms. Some embodiments may additionally select certain types of frames in the decoded video to be part of the subset of frames used to generate the new encoded video sequence. In particular, in MPEG video compression, frames may be designed as intra frames (e.g. I-frames), or inter-frames (e.g. P-frames, and B-frames) depending on different characteristics of the frame with respect to the encoding standard. An inter frame is a video frame that does not require other frames to decode; an inter frame may use data from a one or more additional decoded frames in the sequence of frames to decode. In some embodiments, the process may select the intra frames in the video sequence to include in the subset of frames and only delete frames that are inter frames.

The process generates (410), for each of the frames in the original video sequence that are not selected within the subset, motion vectors that describe the frames in terms of the movement of pixels in frames that are selected as part of the subset of frames from the original video sequence. In some embodiments, each pixel in a frame is described by a motion vector. In several embodiments, the motion vectors for the pixels may be compressed. In particular, in videos that show images where neighboring pixels in a frame generally move in the same direction as one another, the motion vectors may be compressed and/or a reduced number of motion vectors may be used to describe the movement of a collection of neighboring pixels. This may be particularly useful when computing motion vectors for videos that have certain characteristic optical flows, such as videos used to show a view moving along a path through a static environment. Several other embodiments may use a block of pixels (e.g., an 8×8 block or a 16×16 block) to generate a motion vector.

To compute a motion vector, the movement of one or more pixels may be analyzed across one or more frames of the original video sequence. In several embodiments, the process analyzes movement of pixels between a reference first frame (i.e., n) and a subsequent second frame (i.e., n+1). The motion vectors indicate interpolated positions of pixels at times between the first and second frames.

In some embodiments, the process analyzes movement of pixels between a reference frame (i.e., n) and one or more subsequent frames (i.e., n, n−1, ... n+r). Certain embodiments may analyze the movement of pixels between a reference frame that has been included in the subset of frames and the subsequent frames in the original video until reaching the next frame that is also included in the selected subset of frames. For example, if the subset of frames selected from the original video includes every $3^{rd}$ frame (i.e., n, n+3, n+6, etc.) and the original video has a total of z frames such that the total number of frames has been reduced by z/3, then the process may compute for the reference frame n, the movement of the pixels through two subsequent frames of video (i.e., n+1, n+2) and will not analyze the n+$3^{rd}$ frame since this is the next reference frame that has been included in the subset of frames and for which motion vectors may be calculated.

Several embodiments may also analyze the movement of pixels through preceding frames (i.e., n−1, n−2, etc.) relative to a reference frame (i.e., n). Based on the movement of pixels through the one or more frames of video relative to the reference frame, the process may compute motion vectors that describe the direction and the movement of the pixels through the frames. Some embodiments may store the components of the motion vectors using Cartesian coordinates that specify a set of [x,y] coordinates in a two dimensional plane while other embodiments may use polar coordinates that specify a [distance, angle]. Other embodiments may use different coordinate systems and/or values for the motion vectors.

The process stores (415) the motion vectors describing the movement of pixels between at least a first frame in the subset of frames and at least a second frame that is not in the subset of frames. In some embodiments, the motion vectors are stored within one of the reference frames used in computing the motion vectors. Further details regarding processes for storing motion vectors within a frame are described in detail below with reference to FIG. 5. In other embodiments, the motion vectors may be stored separately of the pixel data of a frame of video.

The process decimates (420) the frames not included in the subset of frames from the original video sequence to generate a new video sequence. In some embodiments, the process generates a new video sequence by copying the subset of frames from the original video sequence into the new video sequence. In other embodiments, the process removes frames from the sequence of frames in the original video sequence in order to generate the new video sequence. Other embodiments may decimate the frames from the original video sequence using other mechanisms.

In many embodiments, the process encodes (425) the new video, including the motion vectors, using standardized compression techniques (e.g., MPEG, HEVC, etc.). As described above, many of the standardized compression techniques compute their own set of motion vectors in order to encode inter frames. As some embodiments store the motion vectors within the frames of video, the subsequent encoding of these frames introduces a different set of motion vectors that may be used to decode the video. The motion vectors used to encode the inter frames are generally unavailable during playback of a video. A decoder typically returns decoded frames and does not expose the motion vectors relating the pixels or blocks of pixels within the frames. Thus by embedding the additional motion vectors within the frames, or separately, many embodiments of the invention are able to interpolate frames during the real-time playback of the video on a device using decoded frames output by a decoder. The process then completes.

Although specific encoding processes are described above with reference to FIG. 4, any of a variety of processes can be utilized to select a subset of video frames from encoding at a nominal frame rate and generate motion vectors for all of the frames discarded from the original video sequence as appropriate to the requirements of specific applications in accordance with embodiments of the invention. Processes for embedding motion vectors for use in interpolation of additional frames within the decoded frames of a video sequence in accordance with various embodiments of the invention are discussed further below.

Encoding Motion Vectors within Frames

As described above, some embodiments may encode the motion vectors within frames of video and these embedded motion vectors may be used to interpolate deleted frames of an original video sequence and/or additional frames and thus allow a playback device to vary the playback speed of the video while maintaining the viewing quality of the video. Some embodiments encode the motion vectors using color values of pixels in a frame of video. The color values used to store components of the motion vectors may be a pixel's red, green, and/or blue color values in the RGB color space, and/or a hue, saturation, and/or brightness value within the HSB color model, among various other color models.

Figure 5:
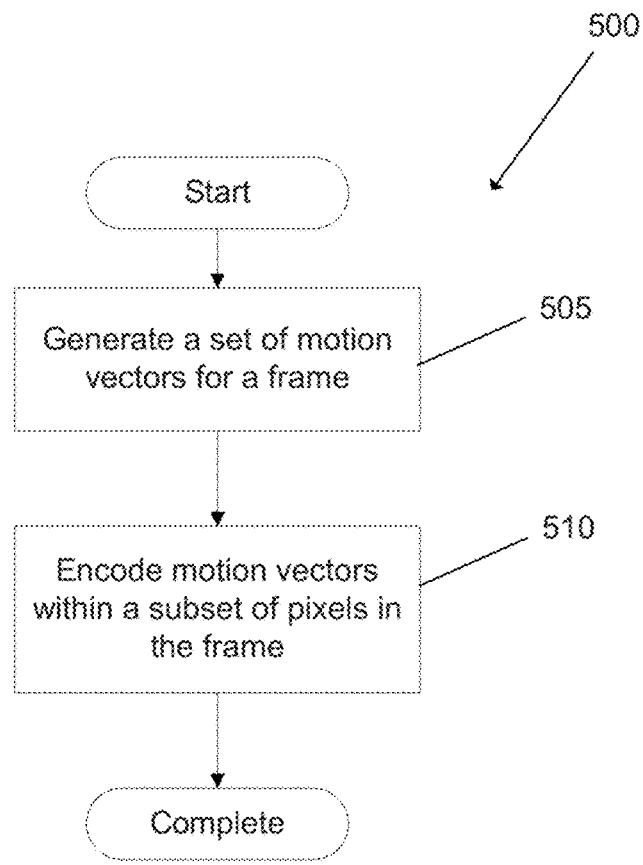
FIG. 5 is a flow chart illustrating a process for encoding motion vectors as additional pixels in a video frame in accordance with an embodiment of the invention.

A process for encoding motion vectors within the video data of a decoded video frame in accordance with an embodiment of the invention is illustrated in FIG. 5. The process 500 generates (505) a set of motion vectors for a frame of video. Various processes for generating motion vectors are described above with reference to FIG. 4. As described above, the motion vectors may be defined using Cartesian coordinates or Polar coordinates. In the Cartesian coordinate system, a motion vector is usually represented by an X and Y component. For example, if a pixel moves 3 pixels to the right and 5.5 pixels upward, it can be represented by the vector (3, 5.5). In the polar coordinate system, a motion vector is usually represented by a distance and an angle (e.g., 0-360 degrees).

The process encodes (510) each motion vector within a corresponding frame of video. In particular, for a particular motion vector, the process may encode the motion vector within the color information of the pixels of a frame. Pixels may have red, green, and blue color values (i.e., RGB). Some embodiments may store a motion vector's X component as a red color value and the Y component as a green color value. In the RGB color space, each R, G, B color component may have a range from 0 to 255 and thus a motion vector may be encoded with a range of [0,0] to [255, 255] pixels. Certain embodiments may shift the values to include negative values (e.g., [−128,−128] to [127,127]) and thus provide for a range of movement within different quadrants of the x,y plane. Furthermore, some embodiments may provide a greater level of precision by using a sub-pixel range of movement by dividing the range by the level of sub-pixel accuracy desired. For example, to obtain a 0.25 pixel movement, the range of 128 may be divided by 4. This provides a greater degree of accuracy at the expense of a shorter range. In this example, the range would be decreased to [−32,−32] to [31.75, 31.75] pixels. Using a greater degree of accuracy may become problematic when pixels in a video are moving fast.

As described above, a problem with storing the motion vectors in the RGB values of a frame may arise when the frames are subsequently encoded using standard compression techniques, which tend to heavily compress the color information of a pixel yet preserve the luminance values of pixels. Thus, storing the motion vectors using the RGB values may cause the motion vectors to be less accurate when the RGB values of the pixels are subsequently decoded.

In order to both provide a greater level of precision for the motion vectors and to preserve the pixel values during a subsequent encoding, many embodiments store the motion vectors using polar coordinates embedded using the hue and the brightness value of a pixel. In particular, these embodiments may use the HSB (hue, saturation, brightness) color model, with the hue value of a pixel corresponding to an angle of the motion vector and the brightness corresponding to the length of the motion vector. Many embodiments use the hue and brightness values of pixels to store the components of the motion vectors in order to preserve the motion vector data and minimize the loss of data that may occur during a subsequent encoding of the video using a standardized compression mechanism. In particular, many compression techniques compress video images based on how the human brain interprets images and not based on mathematical accuracy. Thus, as noted above, luminance is preserved well, but color information is generally heavily compressed since the human brain is more sensitive to contrast rather than color differences. Thus, using hue and brightness values to store the motion vector data helps preserve this data during subsequent encoding and decoding of the video frames.

The hue color model (or hue color spectrum) describes the range of colors along the color spectrum using angles. For example, in the hue color model, 0 degrees represents red, 60 degrees represents yellow, and so forth for the entire color spectrum. Given that polar coordinates are also defined using angles, the hue color model is well suited for storing the angular component of motion vectors. In particular, a motion vector may be embedded by storing the angle of the motion vector within the hue value of a pixel and the length within the brightness of a pixel. The brightness of a pixel may range from 0 to 255 and is generally highly accurate even after encoding since most standardized compression techniques preserve a pixel's brightness value with a higher degree of precision than a pixel's color values. Thus for example, a motion vector that is pointing 127 units to the right may be represented by a pixel with a red hue value (i.e. 0 degrees) at half intensity (i.e., 127). As can be readily appreciated, using the hue and brightness values of a pixel to store motion vectors allows the movement of pixels to be described in a full 360 degree rotation at a full range of 255 pixels in every direction. This provides a larger range compared to the [x,y] range that would otherwise be available using the RGB color components (i.e., [0,0] to [255, 255]), and even in situations where the range is lowered to allow for sub-pixel accuracy.

In some embodiments, the size of a frame is increased to store the motion vectors. In particular some embodiments may append rows of pixels to the bottom portion of a frame that contain the values of motion vectors. For example, a 720×1280p video may add in an additional 30 rows of pixels in order to add a total of 38,400 pixels (i.e., 30×1280) storing the values of motion vectors. Other embodiments may use a number of rows of pixels appropriate to the requirements of specific applications to store an appropriate number of motion vectors to enable the interpolation of intermediate frames between encoded frames in a decoded video sequence. Where the number of motion vectors is smaller than the number of pixels in a frame, motion vectors corresponding to specific pixel locations can be encoded and/or the pixel locations of the motion vectors encoded with the motion vector data. In many embodiments, a playback device may not display the portion of a frame that contains pixels corresponding to motion vectors. Other embodiments may store the motion vectors at different locations within a frame such as the top, sides, in certain areas within the frame or within a header and/or metadata corresponding to the video. Furthermore, as described above, other embodiments may store the motion vectors elsewhere within a container file, and/or in a separate file and provide references within the file to frames of video in the encoded video.

Although specific processes for encoding motion vectors are described above with respect to FIG. 5 any of a variety of processes can be utilized to encode motion vectors as appropriate to the requirements of specific applications in accordance with embodiments of the invention.

Decoding Frames and Using Motion Vectors to Interpolate Intermediate Frames

Figure 6:
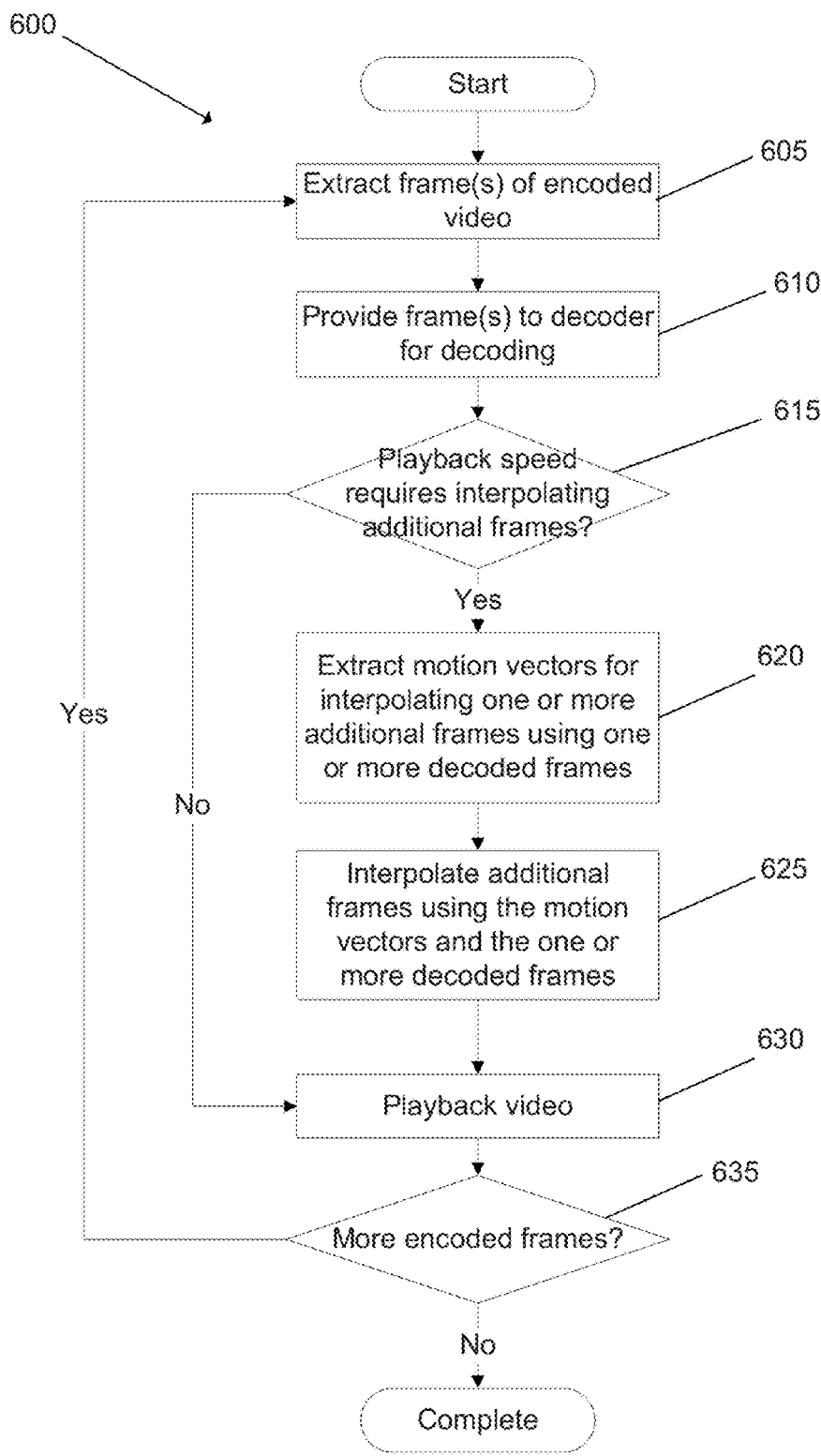
FIG. 6 is a flow chart illustrating a process for using motion vectors to interpolate additional frames from the decoded frames of a video sequence in accordance with an embodiment of the invention.

A playback device may request and receive an encoded video sequence with embedded motion vectors and use the motion vectors to playback the video at a higher frame rate than the nominal frame rate of the encoded video. This is particularly useful in allowing a playback device to adjust the playback speed of a video sequence while maintaining a frame rate that provides a smooth visual quality to the video. For example, the playback speed may be slowed to any particular speed and the playback device may be able to generate new frames in real-time in order to maintain the frame rate of the video and avoid a stuttering effect that would otherwise become apparent without the additional interpolated frames. A process for using motion vectors to interpolate frames from the decoded frames of an encoded video sequence in accordance with an embodiment of the invention is illustrated in FIG. 6.

The process 600 extracts (605) encoded frames from the encoded video sequence. The encoded video may be streamed to a playback device from a distribution server and the playback device may store the streamed frames of encoded video within a buffer.

The process provides (610) the encoded frames to a decoder for decoding. Based on the particular encoding standard used to encode the frames of the video, the process may use an appropriate standards based decoder. Typically, encoding parameters are provided with the encoded video and the encoding parameters are utilized to configure the video decoder. A key parameter for configuring the video decoder is the frame rate of the video sequence. As noted above, the frame rate of the encoded video is the nominal frame rate or rate at which encoded frames are provided to the video decoder. A media player application can playback video at a higher frame rate by using the decoded frames output by the decoder for presentation at the nominal frame rate and the motion vectors to interpolate additional frames. The process next determines (615) whether a given playback speed of the video on the device requires interpolating additional frames. If the playback speed does not require interpolating additional frames, the process plays back (630) the decoded frames of video. For example, if an encoded video is received with a frame rate of 30 frames per second and the playback device is playing back the video at a normal speed (i.e., without increasing or decreasing the playback speed), then the device can play back the decoded video at the same frame rate of 30 frames per seconds. However, if the device adjusts the playback speed to either increase or decrease the speed of the video, this may require interpolating additional frames in order to maintain the smooth visual quality of the video. Note that increasing the speed may not involve changing the frame rate at which video is played back. In many video games movement through a virtual world can involve displaying frames based upon motion. Therefore, slowing the speed of movement may involve interpolation in order to maintain the same frame rate at the slower rate of motion. Accordingly, processes in accordance with embodiments of the invention can interpolate frames to increase frame rate and/or to maintain frame rate in circumstances where additional spacing in time is desired between playback of decoded frames.

When the process determines (615) that it needs additional frames during playback, the process extracts (620) motion vectors for interpolating one or more additional frames using one or more decoded frames. As described above, motion vectors may be extracted during the real-time playback of a video sequence and used to interpolate additional frames when needed to provide a smooth viewing experience even when the playback speed of the video is being adjusted. In order to allow for the interpolation of frames during the real-time playback, some embodiments store motion vectors in a location that is readily available to the playback device and thus can be quickly processed to interpolate additional frames. In several embodiments, the motion vectors are stored as additional pixels within decoded frames. In these embodiments, the process is able to analyze the motion vectors embedded within a particular decoded frame in order to interpolate additional frames. Some embodiments may extract the motion vectors from a separate file that accompanies an encoded video sequence.

Other embodiments may encode the motion vectors within the pixel data of the decoded frames and a playback device may extract these motion vectors by analyzing the frame. In particular, the motion vectors may be extracted based on the color values of a subset of pixels within the frame. For example, the motion vectors may be embedded within pixels in the last 30 rows of a frame for a video encoded at 720p or the last 50 rows for a video encoded at 1080p. The specific number of rows/motion vectors typically depends upon the requirements of a specific application.

Furthermore, as described above, the motion vectors may be embedded in the color values of the pixels, including one or more of the RGB values, the hue values, and/or the brightness values. In particular, many embodiments store the angle component of a motion vector using a hue value of a pixel and the length component of the motion vector using the brightness value of the pixel. In embodiments that use hue values to store the angle of a motion vector, these embodiments may use the graphics processing unit (GPU) in order to facilitate the real time decoding of the hue data. Several other embodiments may use look-up tables with a pixels' red, green and blue component values corresponding to an angle.

The process interpolates (620) additional frames using motion vectors and the one or more decoded frames based on the particular playback speed at which the video is to be played. For example, if the encoded video is provided at a frame rate of 30 frames per second and the playback device has specified a playback speed of the video at ½ the normal speed, in order to maintain the visual quality of the video (i.e., by maintaining a frame rate of 30 frames per second), the playback device would need to double the number of frames in the video sequence in order to maintain the same frame rate at ½ playback speed. In some embodiments, new frames are generated by starting with the pixel data in the closest reference frame provided by the decoded video. Then, using the motion vectors extracted for the particular reference frame, some embodiments interpolate the new pixel location at the point in the new frame.

In several embodiments, in order to interpolate a new frame, the process computes a value for each pixel in the new frame based on the pixel values of a reference frame and the motion vectors provided by the reference frame. However, in many embodiments, the number of motion vectors in a reference frame may be less than the number of pixels in a frame and thus in order to determine the movement of every pixel from the reference frame to a new frame, a number of embodiments apply bilinear filtering to compute motion vectors for every pixel in the frame based upon the motion vectors that are specified. This is particularly useful in video images where neighboring motion vectors share similar properties such as video of motion along a straight line through a static environment. For example, for a video taken from the vantage point of a person walking down a path in a forest, as the person moves along the path, the neighboring pixels will move in a similar manner relative to each other. Thus in this type of video, a smaller set of motion vectors may be stored and the values of pixels may be interpolated using bilinear filtering.

The process displays (630) the decoded frames, including the reference frame followed by the interpolated frames until the next decoded frame. The process determines (635) whether there are more encoded frames that need to be played back on the device. If there are more encoded frames, the process returns to (605). Otherwise, the process completes.

Specific processes for decoding video for playback on playback devices are described above with reference to FIG. 6, however, any variety of processes may be utilized for decoding frames of encoded video and interpolating additional frames using the decoded frames as appropriate to the requirements of specific playback devices in accordance with embodiments of the invention.

Although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive. Accordingly, the scope of the invention should be determined not by the embodiments illustrated, but by the appended claims and their equivalents.

What is claimed is:

1. A non-transitory computer-readable medium containing computer-executable instructions that, when executed by a hardware processor, cause the hardware processor to perform a method for encoding video, the method comprising:
    obtain a first video content comprising a plurality of frames providing a first frame rate;
    generate a set of motion vectors describing movement between frames in the plurality of frames;
    decimate a subset of frames from the plurality of frames of the first video content to generate a second video content having a file size less than a file size of the first video content; and
    encode the second video content and associate the set of motion vectors with the second video content.

2. The non-transitory computer-readable medium of claim 1, wherein the method further comprises storing the set of motion vectors as encoded pixels within frames in the second video content.

3. The non-transitory computer-readable medium of claim 2, wherein a motion vector comprises an angle component and a magnitude component, wherein the angle component is stored within a hue value of a pixel and the magnitude component is stored within a brightness value of a pixel.

4. The non-transitory computer-readable medium of claim 2, wherein a motion vector is encoded as one or more pixels within a portion of a frame that is not displayed during playback of the frame.

5. The non-transitory computer-readable medium of claim 1, wherein the method further comprises encoding the second video content as a sequence of intra and inter frames.

6. The non-transitory computer-readable medium of claim 1, wherein a motion vector describes movement of at least one pixel between a frame in the second video content and a frame in the subset of decimated frames.

7. The non-transitory computer-readable medium of claim 1, wherein a motion vector describes movement of at least one pixel between a particular frame in the first video content and a subsequent nth frame to the particular frame.

8. The non-transitory computer-readable medium of claim 1, wherein the set of motion vectors are stored in a separate file, and each motion vector corresponds to a particular frame in the second video content.

9. The non-transitory computer-readable medium of claim 1, wherein the method further comprises:
    computing a motion vector for each pixel in a particular frame in the first video content and a subsequent frame; and
    compressing motion vectors of a subset of neighboring pixels in the particular frame to generate a new motion vector.

10. The non-transitory computer-readable medium of claim 1, wherein a motion vector describes movement of one or more pixels across a plurality of frames of the first video content.

11. The non-transitory computer-readable medium of claim 1, wherein a motion vector provides interpolated positions of pixels at times between a particular frame and a subsequent nth frame in the first video content.

12. The non-transitory computer-readable medium of claim 1, wherein a motion vector provides interpolated positions of pixels at times between a particular frame and a preceding nth frame in the first video content.

13. The non-transitory computer-readable medium of claim 1, wherein the second video content comprises the plurality of frames of the first video content without the decimated subset of frames.

14. A source encoder, comprising:
   a processor;
   memory including an encoder application;
   where the encoder application directs the processor to:
      obtain a first video content comprising a plurality of frames providing a first frame rate;
      generate a set of motion vectors describing movement between frames in the plurality of frames;
      decimate a subset of frames from the plurality of frames of the first video content to generate a second video content having a file size less than a file size of the first video content; and
      encode the second video content and associate the set of motion vectors with the second video content.

15. The source encoder of claim 14, wherein the encoder application directs the processor to store the set of motion vectors as encoded pixels within frames in the second video content.

16. The source encoder of claim 14, wherein a motion vector describes movement of at least one pixel between a frame in the second video content and a frame in the subset of decimated frames.

17. The source encoder of claim 14, wherein a motion vector describes movement of at least one pixel between a particular frame in the first video content and at least one frame selected from the group consisting of (1) a subsequent nth frame to the particular frame and (2) a preceding nth frame to the particular frame.

18. The source encoder of claim 14, wherein a motion vector describes movement of one or more pixels across a plurality of frames of the first video content.

19. The source encoder of claim 14, wherein the encoder application directs the processor to:
   compute a motion vector for each pixel in a particular frame in the first video content and a subsequent frame; and
   compress motion vectors of a subset of neighboring pixels in the particular frame to generate a new motion vector.

* * * * *